United States Patent
Rutman et al.

(10) Patent No.: US 10,936,453 B2
(45) Date of Patent: Mar. 2, 2021

(54) DATA STORAGE SYSTEMS USING ELASTIC SPARES

(71) Applicant: Seagate Technology LLC, Cupertino, CA (US)

(72) Inventors: Nathaniel Rutman, Portland, OR (US); Nikita Danilov, Moscow (RU)

(73) Assignee: Seagate Technology LLC, Fremont, CA (US)

( * ) Notice: Subject to any disclaimer, the term of this patent is extended or adjusted under 35 U.S.C. 154(b) by 283 days.

(21) Appl. No.: 15/937,335

(22) Filed: Mar. 27, 2018

(65) Prior Publication Data

US 2019/0087290 A1  Mar. 21, 2019

(30) Foreign Application Priority Data

Sep. 19, 2017  (RU) ................................ 2017132656

(51) Int. Cl.
| | |
|---|---|
| *G06F 11/10* | (2006.01) |
| *G06F 11/20* | (2006.01) |
| *H04L 29/08* | (2006.01) |
| *H04L 29/14* | (2006.01) |

(52) U.S. Cl.
CPC ...... *G06F 11/2094* (2013.01); *G06F 11/1092* (2013.01); *G06F 11/2097* (2013.01); *H04L 67/1095* (2013.01); *H04L 67/1097* (2013.01); *H04L 69/40* (2013.01)

(58) Field of Classification Search
CPC ............ G06F 11/2094; G06F 11/1088; G06F 11/1092
See application file for complete search history.

(56) References Cited

U.S. PATENT DOCUMENTS

| | | | | |
|---|---|---|---|---|
| 2003/0231529 | A1* | 12/2003 | Hetrick | G06F 11/1092 365/200 |
| 2003/0237019 | A1* | 12/2003 | Kleiman | G06F 11/1092 714/6.32 |
| 2007/0245083 | A1* | 10/2007 | Margolus | G06F 11/1096 711/114 |
| 2014/0101480 | A1 | 4/2014 | Tiwari et al. | |
| 2014/0351636 | A1* | 11/2014 | Yin | G06F 11/1662 714/15 |
| 2015/0269023 | A1 | 9/2015 | Taranta, II | |
| 2015/0309898 | A1* | 10/2015 | Shi | G06F 11/1076 714/6.23 |
| 2017/0097875 | A1* | 4/2017 | Jess | G06F 11/2069 |

* cited by examiner

*Primary Examiner* — Yolanda L Wilson
(74) *Attorney, Agent, or Firm* — Mueting Raasch Group

(57) ABSTRACT

A system utilizing elastic spares includes nodes and devices to store one or more data objects having information. The data object includes data object units each assigned to a storage location on a different node than the other units. The data object includes one or more spare units to store reconstructed information of a failed unit. When one of the data objects has a failed unit and no spare units available to store reconstructed information, a controller of the system assigns an elastic spare unit to an available storage location of one of the nodes. Reconstructed information of the failed unit is stored in the elastic spare unit.

20 Claims, 5 Drawing Sheets

DATA STORAGE SYSTEMS USING ELASTIC SPARES

This application claims the benefit of priority under 35 U.S.C. § 119(a) of RU Application No. 2017132656 filed Sep. 19, 2017, the disclosure of which is incorporated by reference herein in its entirety.

The present disclosure relates to data storage systems. In particular, the present disclosure relates to PD-RAID data storage systems that utilize elastic spares to protect against additional failures when no assigned spare units of a data object are available.

SUMMARY

Various embodiments of the present disclosure relate to a mechanism for formulaically assigning unused space on an as-needed basis to store reconstructed information. This mechanism may be used in a system for data storage, which may include nodes, devices, or other storage components that can fail.

In one aspect, the present disclosure relates to a system including a plurality of nodes to store one or more data objects. Each node includes a plurality of storage locations. Each data object includes a plurality of data object units each assigned to one of the storage locations of a different node. The plurality of data object units includes one or more spare units to store reconstructed information of a failed unit. The system also includes a controller. The controller is configured to assign an elastic spare unit to an available storage location of one of the nodes when one of the data objects has a failed unit and no spare units available to store reconstructed information. The controller is also configured to reconstruct information of the failed unit and store reconstructed information in the elastic spare unit.

In another aspect, the present disclosure relates to a method including storing data objects in a plurality of nodes. Each node includes storage locations. Each data object includes data object units each assigned to one of the storage locations of a different node. The plurality of data object units includes one or more spare units to store reconstructed information of a failed unit. The method also includes creating at least one spare object in an available storage location of one of the nodes when one of the data objects has a failed unit and no spare units are available to store reconstructed information. The method further includes reconstructing information of the failed unit. The method still further includes storing reconstructed information in the spare object.

In another aspect, the present disclosure relates to a controller configured to manage a plurality of nodes. Each node includes a plurality of storage locations. The controller is also configured to store information of a data object across the plurality of nodes according to a layout function. The data object includes data units, parity units, and spare units. Each of the units is assigned to a different node. The controller is further configured to assign an elastic spare unit to an available storage location on one of the nodes in response to the data object having a failed unit. The controller is still further configured to reconstruct information of the failed unit and store the reconstructed information to the elastic spare unit. The controller is yet further configured to retrieve information of the data object, including information stored in the elastic spare unit, according to the layout function.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
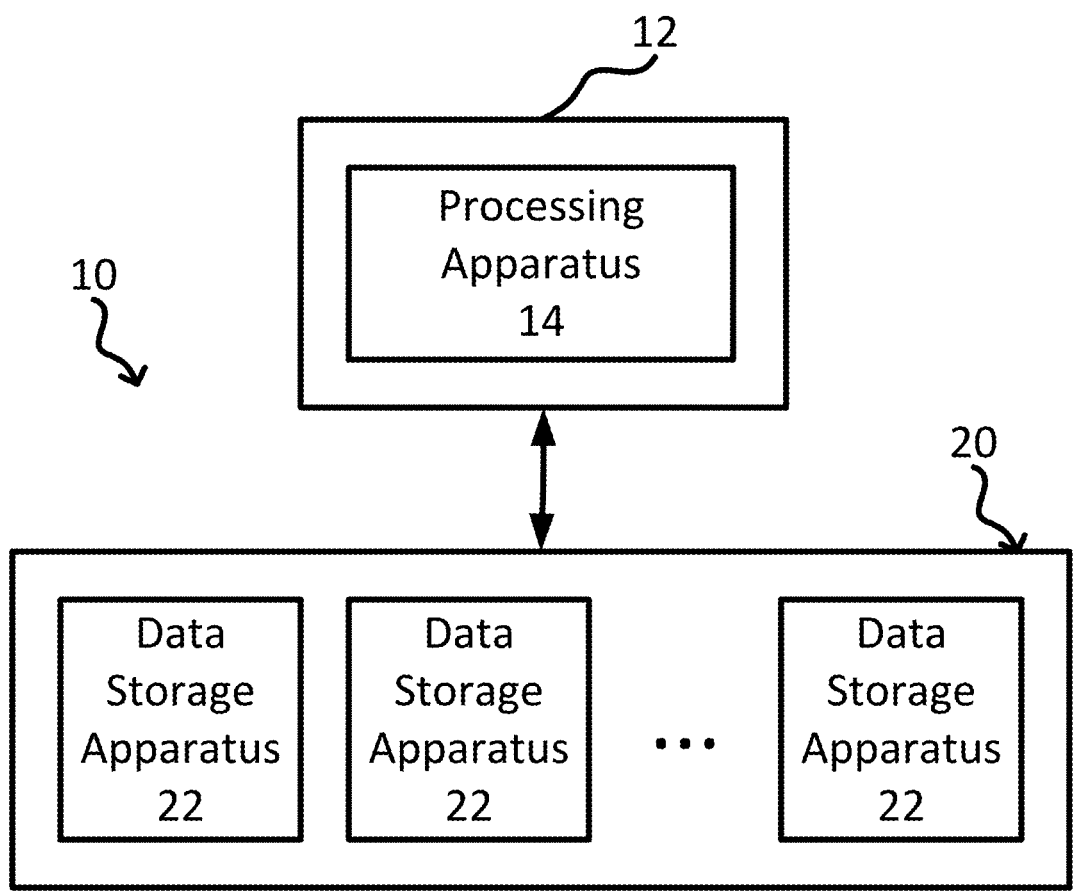
FIG. 1 is a block diagram of a system including a file system for storing data objects.

The present disclosure relates to systems, methods, and processes utilizing elastic spares for data storage systems, such as cloud storage systems. Although reference is made herein to nodes, devices, and parity distributed redundant array of independent disks (PD-RAID) systems, elastic spares may be used with any suitable data storage system with available storage space that stores data on different devices or nodes. Non-limiting examples of data storage drives include hard disk drives, solid state drives, and multilayer drives (for example, utilizing both hard disk and solid state). Various other applications will become apparent to one of skill in the art having the benefit of the present disclosure.

In many storage systems utilizing failure protection (for example, RAID systems), a fixed amount of spare space is designated for the reconstruction of information when storage components fail and units of information stored thereon are lost or become inaccessible. The amount of spare space may be fixed as a ratio to the amount of data. When a storage component fails, such as a device or a node, the lost information may be reconstructed and stored on the spare space. Service personnel are typically tasked with replacing failed storage components within some relatively short period of time, preferably, before all spare space is consumed by consecutive failures and reconstructions. However, multiple failures in a short time (for example, consecutive or sequential failures) may exceed the amount of designated spare space before failed storage components can be replaced. More frequent service visits may reduce the likelihood of exceeding designated spare space but place a larger burden on maintenance costs over time.

Utilizing potentially all unused space in a storage system as spare space may reduce the urgency and frequency of service visits by providing protection of stored information against failures beyond the designated spare space. The mechanism for utilizing the unused space as spare space may be referred to as utilizing "elastic spares." Elastic spares may be described as "overflow" spares, which are employed when originally assigned spare space can no longer contain or house reconstructed information to provide storage to capture the "overflow" of reconstructed information due to more failures. Although full protection of data object information may not be possible when exceeding the designated spare space, elastic spares may be utilized to provide partial protection, or some protection against some types of additional failures. Spare objects may be created on an as-needed basis using a formulaic layout function to designate spare space. This mechanism may provide data availability for not only node or device failures but also for an "unlimited" number of subsequent device failures (until remaining space is no longer available).

Utilizing a layout function may simplify the overall data storage scheme to provide partial protection. Elastic spare units may be assigned without additional permission from a central authority to more efficiently distribute data storage resources, such as available storage space, processing time, and communication bandwidth, which may be particularly advantageous for large-scale systems that accommodate many operations in parallel.

This disclosure provides a mechanism for formulaically assigning unused space for storing reconstructed information on an as-needed basis, which may be beneficial for surviving multiple device failures beyond designated spare space. The mechanism may be used in a system for data storage including, at least, a plurality of nodes and a controller. The nodes may store one or more data objects having information. Each node may include a plurality of storage devices. The controller may manage data in and out of one or more nodes. A controller may include one or more processors. At least one processor may be associated with each node. The controller may assign units of data objects to storage locations in the nodes to store information of the data object. The information of the data object may be protected using a parity scheme, such as PD-RAID, to store data and parity units of information across multiple nodes and/or devices. Data objects may be referred to as "parity groups" in a failure protection scheme utilizing parity information. A layout function may be utilized to determine the storage location for each unit of a data object, for example, to store and retrieve the information from the multiple nodes and/or devices.

In some cases, one or more devices, or even one or more nodes, storing one or more units of a data object may fail. In addition to information-containing units, such as data units and parity units, each data object may include one or more spare units, which do not contain any information upon creation of the data object. Upon failure of an information-containing unit, the information may be reconstructed and stored on one of the spare units to restore full protection of the information of the data object. Given enough failures of units of the data object, the data object may have no spare units available to store reconstructed information. As needed, a spare object may be created including one or more elastic spare units. The same layout function used to assign units of a data object, or a different layout function specific to spare objects, may be utilized to assign the elastic spare units to storage locations. When spare units are available, full protection of information in the system may be provided. When all spare units are unavailable, the elastic spare units may be used to store reconstructed information and provide partial protection. Partial protection may protect against additional device failures but may not protect against additional node failures (for example, because more than one unit would be stored on the same node). The layout functions may facilitate storage and retrieval of information from the spare object formulaically, which may not use communication of the storage location to or from a central authority. In some cases, one or more of a data object identifier, a number of data, parity, and spare units, and known failure information may be used to retrieve information. Various examples of the system, as well as related methods and processes, are described herein in more detail as related to the accompanying figures.

FIG. 1 shows a block diagram of a system 10 including a file system for storing data objects. The system 10 includes a host device 12 (for example, a personal computer, server, etc.) and a file system 20. The host device 12 may be operably coupled to the file system 20 to read and write data objects or files from and to the file system. The host device 12 may include a processing apparatus 14 to carry out various functionality of the host device. Although a single host device is depicted, it is to be understood that the system 10 may include a plurality of host devices 12 operably coupled to the file system 20.

Additionally, the file system 20 itself may include one or more computing apparatuses to provide functionality provided by the file system 20. More specifically, the one or more computing apparatuses of the file system 20 may include one or more controllers configured to provide the reading and writing one or more data objects from the file system 20 and the one or more mechanisms and processes associated with the layout functions described herein. For example, the host device 12 may request data from a data object from the file system 20, and the file system 20 may return the requested data of the data object. Further, for example, the host device 12 may attempt to write data to a data object of the file system 20, and the file system 20 may facilitate the writing of the data to the data object.

One or more of the processing apparatuses, computing apparatuses, or controllers described herein may include a processor, such as a central processing unit (CPU), computer, logic array, or other device capable of directing data coming into or out of the host device 12 and/or the file system 20. In some embodiments, the controller includes one or more computing devices having memory, processing, and communication hardware. The functions of the controller may be performed by hardware and/or as computer instructions on a non-transient computer readable storage medium.

The processor of the controller may include any one or more of a microprocessor, a controller, a microcontroller, a digital signal processor (DSP), an application specific integrated circuit (ASIC), a field-programmable gate array (FPGA), and/or equivalent discrete or integrated logic circuitry. In some examples, the processor may include multiple components, such as any combination of one or more microprocessors, one or more controllers, one or more DSPs, one or more ASICs, and/or one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system.

In one or more embodiments, the exemplary systems, methods, and interfaces may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. In view of the above, it will be readily apparent that the controller functionality as described herein may be implemented in any manner known to one skilled in the art.

As shown, the file system 20 includes a plurality of data storage apparatuses 22 for storing the data objects. Each data storage apparatus 22 may include any device and/or apparatus configured to store data (for example, binary data, etc.). The data storage apparatuses 22 can include, but are not necessarily limited to, solid state memory, hard magnetic discs, magnetic tapes, optical discs, integrated circuits, volatile memory, nonvolatile memory, and any combination thereof. Further, each data storage apparatus 22 may be an array of storage devices such as, for example, a RAID (redundant array of inexpensive disks) storage arrangement. Each data storage apparatus 22 may be a server or virtual server. It is to be understood that this disclosure is not be limited to the system 10 depicted in FIG. 1, and instead, the system 10 is only one exemplary configuration. For example, file system 20 may include one or more of a local filesystem, a storage area network (SAN) file system, a distributed file system, a parallel file system, a virtual file system, and/or combinations thereof.

In various embodiments, each data storage apparatus 22 may be described as a storage device. In some further embodiments, each data storage apparatus 22 may be described as a node, each of which may include a plurality of storage devices. In still further embodiments, each data storage apparatus 22 may be described a plurality of nodes used in a failure protection scheme, such as PD-RAID.

The file system 20 may be further described as a system designed to provide computer application programs on the host 12 with access to data stored on the data storage apparatuses 22 in a logical, coherent way. Further, the file system 20 may be described as hiding the details of how data is stored on data storage devices 22 from the host 12 and application programs running on the host 12. For instance, the data storage devices 22 may be generally block addressable, in that data is addressed with the smallest granularity of one storage block, and multiple, contiguous data portions or chunks may define, or form, an extent. An extent may be defined as a portion of data within a data object or file. In other words, an extent may be described as a range of bytes within the data object or file including one or more storage blocks. The size of the particular storage block, for example, 1024 kilobytes in length, may depend upon the type and size of the data storage apparatus 22. Application programs on the host 12 may request data from file system 20, and the file system 20 may be responsible for seamlessly mapping between application logical extents within a data object and physical space on data storage apparatus 22.

Existing file systems have used various methods to provide such mapping. For example, filesystems may use mapping information or meta data according to a layout to provide storage locations for data on data storage apparatuses 22 via lookup (for example, extent lists in a node in the case of a local filesystem such as the EXT4 file system, or a set of object/server pairs in a distributed system such as LUSTRE file system) or formulaically (for example, parameters to a SWIFT ring). These existing file systems may suffer from an assumption that the layout remains mostly static. For example, modifying some or all of the data layout may typically require either a complete rewrite of lookup information or movement of the data itself to accommodate new parameters.

A layout may be defined as a description of the storage location where particular information (for example, a data object or a spare object) is stored, or is to be stored, in a file system. The term "OID" is used throughout this disclosure to mean an "Object Identifier," which may be used as a handle, or descriptor, to reference a particular layout for a data object or spare object. For some types of layouts, an OID may be used with various other parameters as inputs to a layout function for an object to map or associate to a particular layout of units in the object. The layout function may be defined by the type of failure protection scheme used by the file system 20 to protect information stored in the file system against various types of failures. In various embodiments, the layout function may provide protection against the failure of information stored in each data object using PD-RAID.

Figure 2:
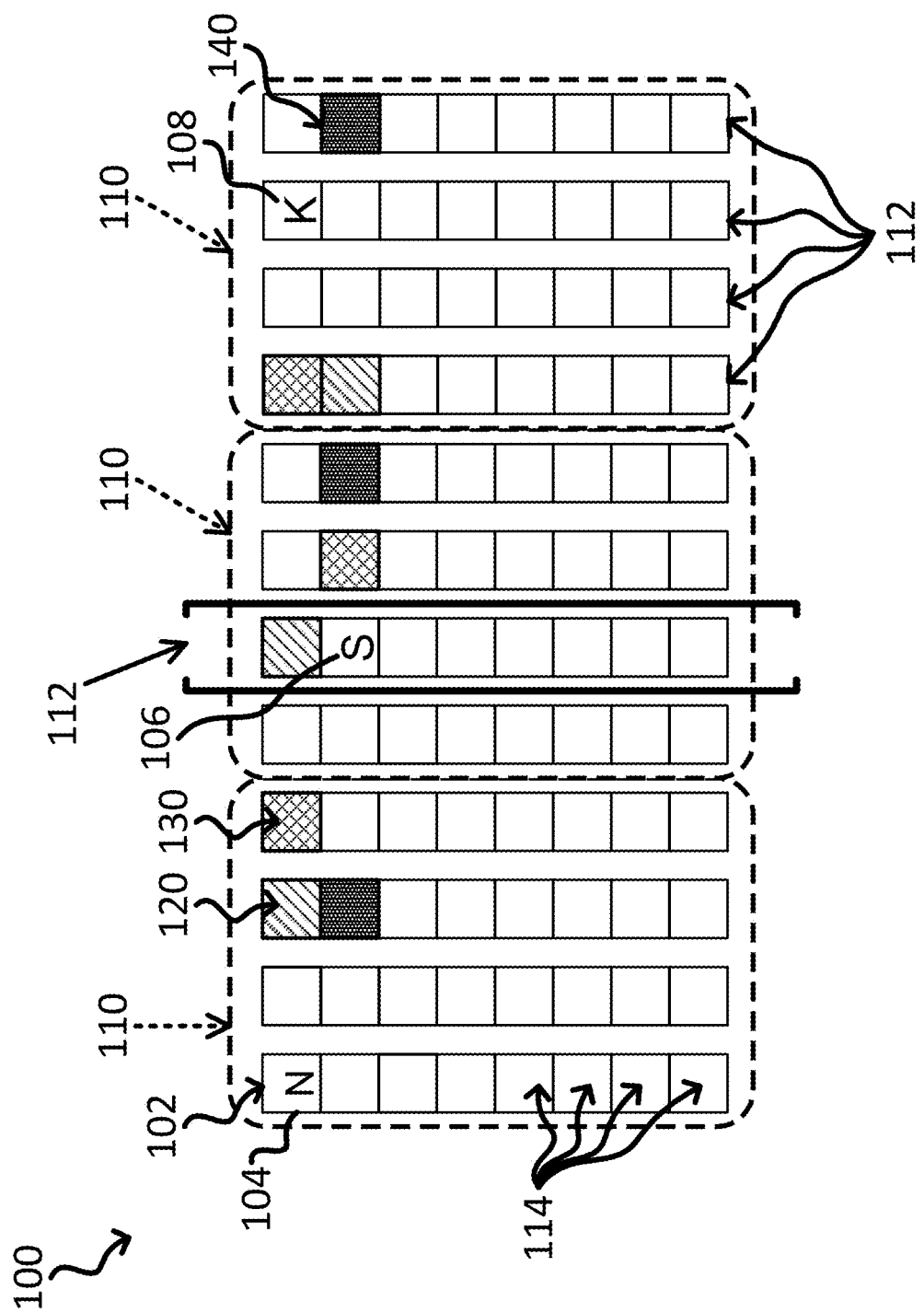
FIG. 2 is a diagram of a layout for a data object including various units.

To illustrate components used in various embodiments of the present disclosure described herein, FIG. 2 is provided and shows a diagram of a layout of a data object 102 in a data storage system 100. The system 100 may include a plurality of nodes 110 and/or a plurality of devices 112 to store one or more data objects 102. Other data objects 120, 130, 140 may also be stored on the system 100 in addition to data object 102. Each data object 102, 120, 130, 140 is represented by different hatching in FIG. 2 as indicated by the key provided therein.

Each node 110 may represent a different physical and/or logical grouping devices 112, such as a different array, a different rack, a different room, a different data center, or a different geographic region. In some embodiments, each node 110 may be operably coupled, for example, by a network and form part of a storage network.

Each node 110 may include a plurality of storage locations 114 associated with the node. A storage location 114 may refer to a physical or logical location, or address, within the storage space. Each storage location 114 may be associated with any suitable amount of storage space, such as one or more storage blocks or extents. In some embodiments, each node 110 may include a plurality of devices 112, and each device 112 may include a plurality of storage locations 114. Each device 112 may be a data storage apparatus or data storage drive that provides space to store information, such as a hard disk drive, a solid-state drive, or a multilayer drive.

Each data object 102 may include a plurality of units. A unit may refer to an amount of storage space and may also refer to an associated location for that space (for example, the storage location 114). In some embodiments, a unit may include one or more storage blocks. Different types of units may have the same or different amount of storage space.

The data object 102 may include one or more of data units 104, parity units 106, and spare units 108. The data unit 104 may store user data information that is to be read, written, and modified. The parity unit 106 may store parity information for use in reconstruction of user data stored in one or more data units 104 that have failed. For example, information may be reconstructed using the remaining data and parity units 104, 106. The data units 104 and parity units 106 may store information following creation of the data object 102. The spare unit 108 may be used to store reconstructed information of a data or parity unit 104, 106 that has failed. The spare units 108 may not store information upon creation of the data object 102.

Each unit 104, 106, 108 may be assigned to one of the storage locations 114. Assigning a unit 104, 106, 108 may entail reserving the storage location 114 (and an associated amount of space) for information to be stored. Assigning may also entail assigning a particular type of unit or a particular individual unit to the storage location 114.

The units 104, 106, 108 of the data object 102 may be stored on devices 112 as a user writes data. Available space may be allocated on the assigned devices 112 at write time. Space for a unit 104, 106, 108 may not be consumed until the information is written to the unit. As devices 112 or nodes 110 fail, the system 100 may reconstruct lost information stored in the data object 102. Reconstruction may utilize the remaining data and parity information (the information stored in units 104, 106, 108 that have not failed) to produce the reconstructed information. The reconstructed information may be stored in one or more available spare units 108. Additionally, the failures of the devices 112 and nodes 110 may be tracked as known failure information by the system 100 and updated in response to new failures.

The data object 102 may be stored according to a PD-RAID scheme. In a PD-RAID scheme, the data object 102 is distributed across the nodes 110. Each of the units 104, 106, 108 may be assigned a storage location 114 on a different node 110 than the other units of the data object 102. In the illustrated embodiment, the data unit 104 is stored on a different node than the parity unit 106, which in turn, is stored on a different node than the spare unit 108.

Any suitable technique may be used to distribute the data object 102 across the nodes 110, which may be described as a layout. In some PD-RAID schemes, the layout of a data object 102 can be characterized by the number of data units of the data object (N), the number of parity units of the data object (K), and the number of spare units of the data object (S). Although a typical data object 102 may include multiple data units 104, parity units 106, and spare units 108 (for example, N>1, K>1, and S>1), FIG. 2 shows a data object 102 having N=1, K=1, and S=1 for illustrative purposes.

A layout function may be used to implement layouts for a PD-RAID scheme at a data object level. The layout function may determine the storage location 114 for each unit 104, 106, 108 of the data object 102 and provide an output in response to one or more inputs. The storage location 114 may be determined formulaically based on the inputs. Non-limiting examples of inputs to the layout function include one or more of an OID, N, K, S, and known failure information.

Figure 3:
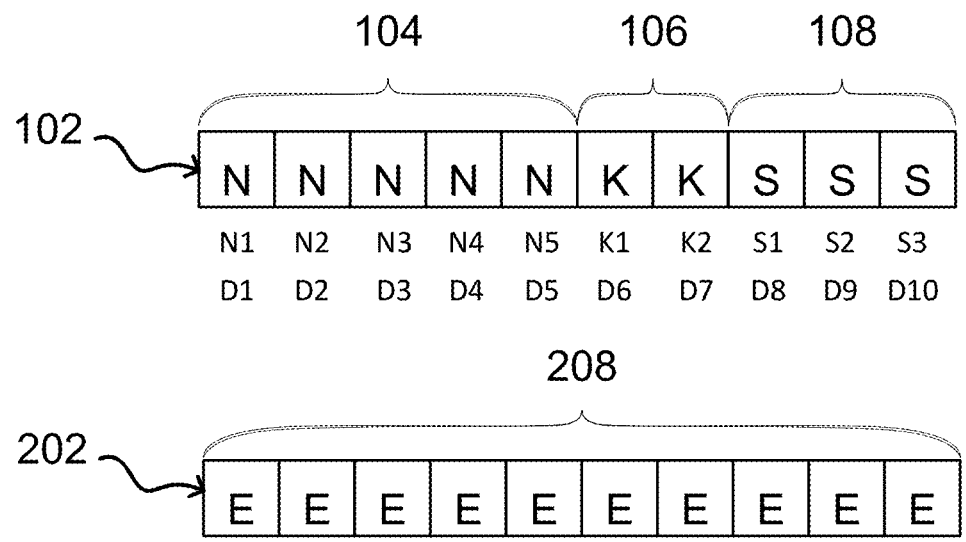
FIG. 3 is a diagram of a data object and a spare object including various units.

The output of the layout function may include a storage location 114 for each unit of the data object 102. In some embodiments, the output of the layout function may also include the type of unit associated with each storage location 114. For example, when the layout function is used to retrieve information from the data object 102, the information stored in D1 (see FIG. 3) may be retrieved with an indication of the type of unit (for example, a data unit). In some embodiments, the output of the layout function may also include an index associated with each storage location 114. For example, each of the units 104, 106, 108 the data object 102 may be indexed, such as D1 through D10 (for example, N1=D1, N2=D2 . . . K1=D6 . . . and S3=D10 as shown in FIG. 3). When the layout function is used to retrieve information from the data object 102, the information stored in D1 may be retrieved with an index of each unit (for example, D1 or N1).

The layout function may include a mechanism to determine storage locations to create, allocate, and distribute information of the data object 102 to various storage locations 114, as well as a mechanism to determine storage locations of reconstructed information after one or more failures. The mechanism to determine the location of reconstructed information may be based on an iterative algorithm. In some embodiments, the layout function may increment or otherwise modify an internal parameter to point to a new storage location until a non-failed unit is found for storage or retrieval of reconstructed information. For example, if a data unit of a data object is affected by a failure and reconstructed in a spare unit, the layout function may determine that the original storage location of the data unit is associated with a failure (for example, is a failed unit) and increment an internal parameter (associated with the original storage location itself and/or the device or node the original storage location is located on) until a non-failed unit is located, which stores the reconstructed information of the data unit. In some embodiments, an input such as the OID may be incremented or otherwise modified to point to a new storage location until a non-failed unit is found for storage or retrieval of reconstructed information. In some embodiments, the algorithm may first iterate through storage locations for spare units 108 and then iterate through storage locations for elastic spare units. Any other suitable algorithm for formulaically finding reconstructed information may also be used.

In some embodiments, a storage location may include a device identifier, a location on a device, or both. The storage location may identify one or more of a node, a device, and a particular location on a device. For example, the output of the layout function may be specific and identify the particular location on a particular device on a particular node. In another example, the output of the layout function may be less specific and identify a particular device on a particular node but not a particular location on the device. Another mechanism, on the device level, may determine the particular location on the device, for example, in response to one or more of the inputs of the layout function or another output of the layout function.

For a PD-RAID scheme, the layout function may ensure that no two units of the same data object are placed on the same device 112 to protect against failure of at least K devices (for example, protecting the "Device Failure Domain"). When a device 112 fails, stored information of a unit 104, 106, 108 on the failed device may be reconstructed to an available spare unit 108 of the data object 102. A spare unit 108 may contain information when reconstructed information is stored to the spare unit. As additional failures occur, more spare units 108 are consumed. For the number of devices 112 in the system 100 (D), the maximum number of spare units 108 possible may be calculated as S=D−N−K. When more than S device failures occur, information can no longer be reconstructed to the spare units 108 to provide full N+K protection.

The PD-RAID scheme may also be applied to interconnected or networked devices 112. The devices 112 may be grouped, physically or logically, into a plurality of nodes 110, which in turn may be connected by a network. The layout function may ensure that no two units of the same data object are placed on the same node 110 to protect against failure of at least K nodes (for example, protecting the "Node Failure Domain"). For the number of nodes 110 (O) in the system 100, the maximum number of spare units possible may be calculated as S=O−N−K. When more than S node failures occur, information can no longer be reconstructed to the spare units 108 to provide full N+K protection.

Protection of the Node Failure Domain may provide protection over the Device Failure Domain and, thus, may provide full protection of the system 100. The loss of a device 112 may be considered in the same way as the loss of the node 110 hosting that device. However, when protection of the Node Failure Domain is compromised (not full N+K protection), the system 100 may still provide protection over the Device Failure Domain by utilizing elastic spares.

Utilizing elastic spares may include reconstructing information to a node that already contains a unit 104, 106, 108 of the data object 102 to provide protection against further device failures, even if protection against further node failures is not possible, which may be described as partial protection of the system 100. Once S spare units 108 are used, a new object may be created by a layout function that contains elastic spare units. In a partial protection mode, the elastic spare unit and another unit of the data object may be stored on different devices of the same node (for example, not fully distributed).

FIG. 3 shows a diagram of a typical data object 102 including a plurality of data units 104, parity units 106, and spare units 108 and, for comparison, a typical spare object 202. Any number of units may be used in either object 102, 202. Each of the data object 102 and the spare object 202 may have the same number of units. The data object 102 and the spare object 202 typically include different types of units. The spare object 202 may include only elastic spare units E 208. The data object 102 is shown to include 5 data units N 104, 2 parity units K 106, and 3 spare units S 108 for illustrative purposes for a total of 10 units. The data object 102 may be indexed as D1 through D10. Each of the units 104, 106, 108 may also be sub indexed as N1 through N5, K1 through K2, and S1 through S3. As shown, the spare object 202 includes 10 elastic spare units E 208. The elastic spare units 208 may also be indexed and/or sub indexed similar to data object 102 (for example, E1 through E10).

The data object 102 and the spare object 202 may be created according to the same layout function or, at least, according to the same formula for identifying storage locations. For example, the system may utilize different layout functions, such as a data layout function for data objects and a spare layout function for spare objects. Even when the layout functions are different, both layout functions may use the same formula to assign units to storage locations. For example, the output of the layout function may include only storage locations for the units and may not include the type of each unit. When an object is created in the system, whether a data object 102 or a spare object 202, the units would be assigned to the same storage locations. The difference between data objects 102 and spare objects 202 may be only in how the units are used and not how the units are assigned to storage locations. In other embodiments, the formula used to assign units for a spare object may be different than the formula used for data objects. When, after a series of failures and reconstructions, all the spare units 108 of a data object 102 (for example, parity group 1 or PG1) are used, or none are available, a spare object 202 (for example, PG2) may be created according to a layout function to utilize spare space. The elastic spare units 208 of the spare object 202 may be assigned to available storage locations. In particular, the spare object 202 may be distributed among devices or nodes using a layout function so that no two elastic spare units 208 are located on the same device or node. In other words, each elastic spare unit 208 may be assigned to a different node.

Information may not be stored on some of the elastic spare units 208 until an additional failure requires more spare space to store reconstructed information. For example, when S devices or nodes have failed, a spare object 202 may be created to store reconstructed information on at least one elastic spare unit 208 while leaving the remaining elastic spare units of the spare object available as storage for future failures.

The step of creating a spare object 202 may be repeated when all the elastic spare units 208 of the previously created spare object have been used or are unavailable. In other words, another spare object 202 (PG3) may be created, as needed, which may include elastic spare units 208. For example, when S+(N+K+S) devices or nodes have failed, another spare object 202 may be created to store reconstructed information. In some embodiments, additional spare objects 202 (PG3, PG4, PG5, etc.) may be created as needed until the unused storage space is exhausted or some other threshold is reached.

The system may also respond to the failure of an elastic spare unit 208. When an elastic spare unit 208 fails, the information stored on the elastic spare unit may be reconstructed and stored on another, or subsequent, elastic spare unit.

One or more alerts to service personnel may be automated by the system 100 based on various conditions, for example, to prompt replacement of failed storage components. In some embodiments, a controller of the system may provide an alert when no more storage devices have available storage locations to assign elastic spare units. An alert may also be provided when a partial protection mode is entered, or even when each spare object 202 is created or when each elastic spare unit is used.

In a system utilizing two failure domains, such as the Node Failure Domain and the Device Failure Domain, partial protection of stored information may no longer be provided when unused storage space is exhausted or the number of non-failed devices drops below N. For example, in a system with 12 devices and N=5 data units 104 per data object 102, experiencing 7 device failures will result in 5 non-failed devices remaining. No matter which device the elastic spare unit 208 is located, a failure of any of the 5 devices will result in a loss of one of the N=5 data units.

Some systems may utilize more than two failure domains. For example, the failure of a data center could be described as a Data Center Failure Domain and be incorporated into the layout function in addition to the Node Failure Domain and the Device Failure Domain.

Failures may be tracked by the system. For example, when a device or node fails, the units associated with the device or node may be tracked as failed units. This known failure information may be updated in response to detecting a new failure. The known failure information may be used in various ways to store and retrieve information. In some embodiments, the layout function may assign the elastic spare units 208 to storage locations regardless of whether the storage location is associated with a failed unit (for example, a failed device or node). In such embodiments, elastic spare units assigned to storage locations associated with the known failure information can be skipped or avoided when storing or retrieving information. As mentioned herein, the layout function may include an algorithm that iterates through storage locations until reconstructed information is found. The known failure information may be used to identify which units have failed or not failed. In other embodiments, the layout function may accept known failure information as an input and avoid assigning elastic spare units 208 to known failed storage locations.

Figure 4:
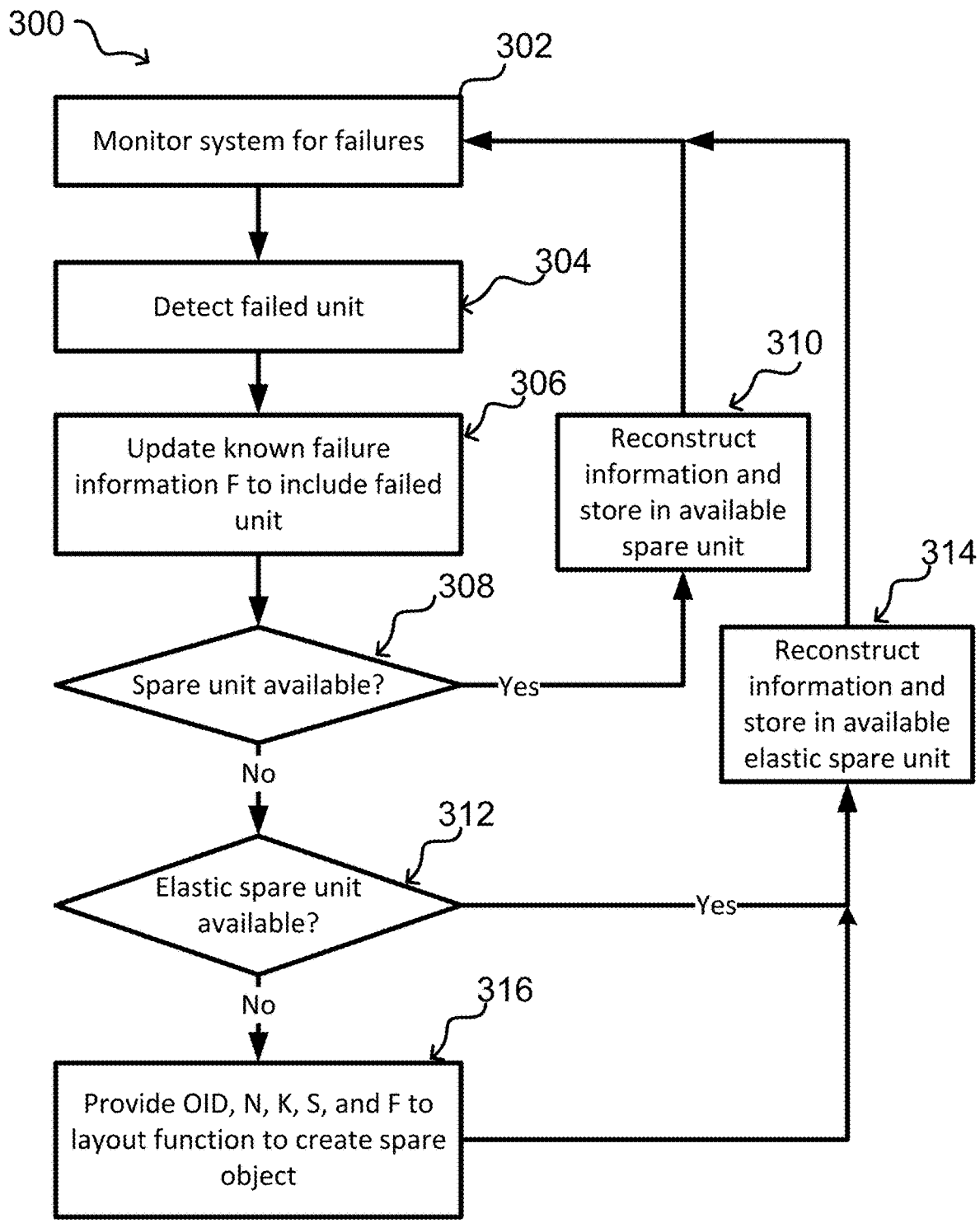
FIG. 4 is a flowchart of a method of using elastic spares.

FIG. 4 is a flowchart of a method 300 of using elastic spares in a data storage system. In process 302, a data storage system is monitored for failures. Failures may correspond to the failure of a node, device, or other storage component. The failure may affect one or more units storing information. For example, a failure may be detected when the user attempts to retrieve information from a data object. The node and/or device attempting to read units of the data object may detect that the information retrieved fails to satisfy an error correction code (ECC) check. The retrieval failure may result in a determination that a node, device, or other storage component (for example, a sector) has failed.

The method 300 may proceed to process 304, in which, the units associated with the data object that are affected by the failure are determined. For example, a data or parity unit storing information may be affected by the failure and be classified as a failed unit. As another example, a spare or elastic spare unit storing reconstructed information may be affected by the failure and be classified as a failed unit. The data object (for example, by data object identifier) associated with the failed unit may also be determined as part of the failed unit detection or determination.

The method 300 may proceed to process 306, in which, known failure information (F) may be updated to indicate the failed unit. The known failure information may later be used as an input to a layout function.

The method 300 may proceed to process 308, in which, whether an available spare unit of the data object containing the failed unit may be determined.

If a spare unit is available, the method 300 may proceed to process 310, in which, information of the failed unit is reconstructed (using remaining information of the data object) and stored in the available spare unit. If a spare unit is unavailable, the method 300 may proceed to process 312, in which, whether an elastic spare unit is available may be determined.

If an elastic spare unit is available, the method 300 may proceed to process 314, in which, information of the failed unit is reconstructed (using remaining information of the data object and any spare objects) and stored in the available elastic spare unit. If an elastic spare unit is unavailable, the method 300 may proceed to process 316, in which, inputs may be provided to a layout function to create a new spare object, which may provide elastic spare units that are available to store reconstructed information. The inputs may include an OID, N, K, S, and/or F. The layout function may provide an output that includes one or more storage locations, one or more data unit types, and/or one or more data unit indices. The output of the layout function may be used to create the spare object, which may entail assigning elastic spare units to storage locations. The method 300 may proceed to process 314, in which, information of the failed unit is reconstructed (using remaining information of the data object and any spare objects) and stored in one of the available elastic spare units of the newly created spare object. Following processes 310, 314, the method 300 may proceed to process 302 to continue monitoring the system for failures. In some embodiments, process 302 is continued even while other processes of the method 300 are being executed, which may prevent missing additional failures while information is being reconstructed.

Figure 5:
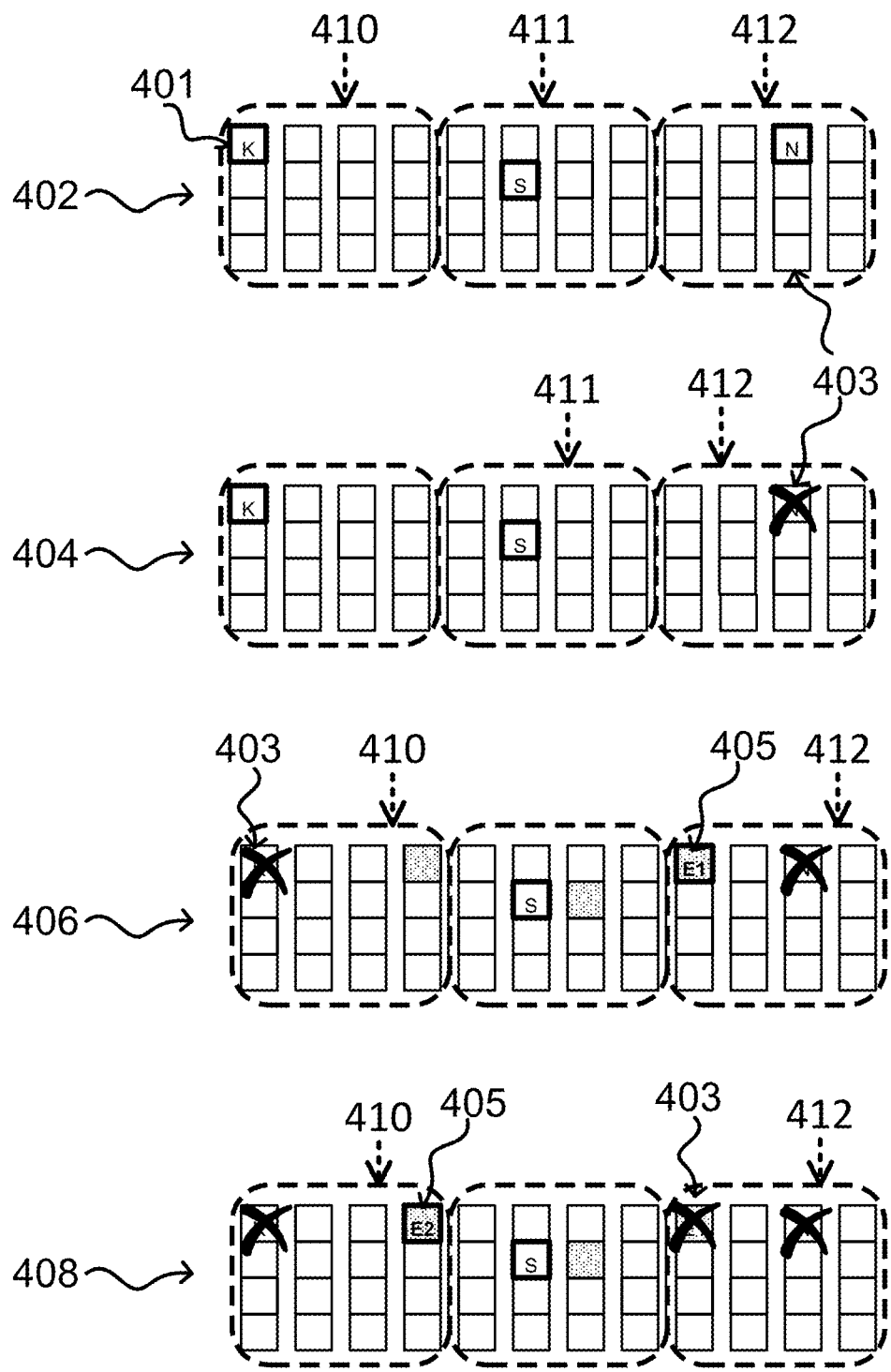
FIG. 5 is a diagram of layouts for a data object as units fail and elastic spares are assigned.

The mechanism for using spare space in response to failures may be seen in FIG. 5, which is a diagram of layouts 402, 404, 406, and 408 for a data object 401 defined by N=1, S=1, and K=1 and including data unit N stored on node 412, parity unit K stored on node 410, and spare unit S stored on node 411. In FIG. 5, the units of data object 401 are illustrated with N, S, and K. Each of the 3 nodes 410, 411, 412 includes a plurality of devices 403. In particular, as illustrated, each node 410, 411, 412 may include 4 devices 403. In layout 402, none of the nodes 410, 411, 412 has failed, or has a failed unit or device.

In layout 404, the device 403 storing the data unit N in node 412 has failed. Upon detecting the failure, the information stored in data unit N is reconstructed and stored in spare unit S of the data object 401 on node 411.

In layout 406, the device 403 storing parity unit K in node 410 has failed. Upon detecting the failure and no available spare units (for example, because the data object 401 only had 1 spare unit S), a spare object 405 including elastic spare unit E1 on node 412 is created according to a layout function. In FIG. 5, the units of spare object 405 are illustrated with cross-hatching. The information stored in parity unit K is reconstructed and stored in elastic spare unit E1 on node 412. In particular, a controller including a processor associated with one of the nodes may be configured to assign an elastic spare unit E1 to an available storage location of a node when the data object has a failed unit and no spare units S are available.

The elastic spare units of the spare object may be assigned to protect the Node Failure Domain and the Device Failure Domain. In some embodiments, the elastic spare unit E1 may be assigned to a device 403 that does not store another unit of the one data object. For example, elastic spare unit E1 is not stored on the same device 403 as failed data unit N on node 412.

Additional elastic spare units may be assigned to additional available storage locations when the data object has additional failed units. In layout 408, the device 403 storing elastic spare unit E1 in node 412 has failed. Upon detecting the failure and no available spare units, the information stored in elastic spare unit E1 is reconstructed and stored in elastic spare unit E2 of spare object 405 on node 410. Elastic spare unit E2 may have been assigned to its storage location upon the creation of spare object 405.

Thus, various embodiments of DATA STORAGE SYSTEMS USING ELASTIC SPARES are disclosed. Although reference is made herein to the accompanying set of drawings that form part of this disclosure, one of at least ordinary skill in the art will appreciate that various adaptations and modifications of the embodiments described herein are within, or do not depart from, the scope and spirit of this disclosure. For example, aspects of the embodiments described herein may be combined in a variety of ways with each other. Therefore, it is to be understood that, within the scope of the appended claims, the claimed invention may be practiced other than as explicitly described herein.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (for example 1 to 5 includes 1, 1.5, 2, 2.75, 3, 3.80, 4, and 5) and any range within that range. Herein, the terms "up to" or "no greater than" a number (for example, up to 50) includes the number (for example, 50), and the term "no less than" a number (for example, no less than 5) includes the number (for example, 5).

The terms "coupled" or "connected" refer to elements being attached to each other either directly (in direct contact with each other) or indirectly (having one or more elements between and attaching the two elements).

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its non-exclusive sense meaning "and/or" unless the content clearly dictates otherwise.

As used herein, "have," "having," "include," "including," "comprise," "comprising" or the like are used in their open ended sense, and generally mean "including, but not limited to". It will be understood that "consisting essentially of," "consisting of," and the like are subsumed in "comprising," and the like.

The phrases "at least one of," "comprises at least one of," and "one or more of" followed by a list refers to any one of the items in the list and any combination of two or more items in the list.

What is claimed is:

1. A system comprising:
a plurality of nodes to store one or more data objects, each node comprising a plurality of storage locations, each data object comprising a plurality of data object units each assigned to one of the storage locations of a different node, the plurality of data object units comprising one or more spare units to store reconstructed information of a failed unit; and
a controller configured to:
assign an elastic spare unit to an available storage location of one of the nodes when one of the data objects has a failed unit and no spare units available to store reconstructed information; and
reconstruct information of the failed unit and store reconstructed information in the elastic spare unit.

2. The system of claim 1, wherein the elastic spare unit is assigned to the available storage location according to a partial protection mode in which the elastic spare unit and another data object unit of the one data object are stored on the same node.

3. The system of claim 1, wherein the controller includes one or more processors associated with one of the nodes.

4. The system of claim 1, wherein each node comprises a plurality of storage devices, each storage device comprising a plurality of the storage locations.

5. The system of claim 4, wherein the available storage location is on one of the storage devices that does not store another data object unit of the one data object.

6. The system of claim 4, wherein the controller is further configured to provide an alert when no more storage devices comprise available storage locations to assign the elastic spare unit.

7. The system of claim 1, wherein the controller is further configured to assign additional elastic spare units to additional available storage locations when the one data object has additional failed units.

8. The system of claim 1, wherein the controller is further configured to update known failure information to indicate the failed unit.

9. The system of claim 1, wherein the plurality of data object units comprises one or more data units and one or more parity units, each of the data and parity units storing information.

10. A method comprising:
storing data objects in a plurality of nodes, each node comprising a plurality of storage locations, each data object comprising a plurality of data object units each assigned to one of the storage locations of a different node, the plurality of data object units comprising one or more spare units to store reconstructed information of a failed unit; and
creating at least one spare object in an available storage location of one of the nodes when one of the data objects has a failed unit and no spare units available to store reconstructed information;
reconstructing information of the failed unit; and
storing reconstructed information in the at least one spare object.

11. The method of claim 10, further comprising assigning data object units of data objects and the at least one spare object according to a same layout function.

12. The method of claim 10, wherein the one data object and the at least one spare object each comprise a same number of data object units.

13. The method of claim 10, wherein the at least one spare object comprises only elastic spare units.

14. The method of claim 13, wherein the elastic spare units of each spare object are assigned to a different node.

15. The method of claim 10, further comprising allocating elastic spare units for the at least one spare object according to a spare layout function different than a data layout function for data objects.

16. A controller configured to:
manage a plurality of nodes, each node comprising a plurality of storage locations;
store information of a data object across the plurality of nodes according to a layout function, the data object comprising data units, parity units, and spare units, each of the units assigned to a different node;
assign an elastic spare unit to an available storage location on one of the nodes in response to the data object having a failed unit, wherein the elastic spare unit is assigned to the available storage location of one of the nodes when the data object having the failed unit and no spare units of the data object are available to store reconstructed information;
reconstruct information of the failed unit and store the reconstructed information to the elastic spare unit; and retrieve information of the data object, including information stored in the elastic spare unit, according to the layout function.

17. The controller of claim 16, wherein the layout function provides storage locations based on an identifier of the data object, a number of data units, a number of parity units, a number of spare units, and known failure information.

18. The controller of claim 16, wherein the layout function provides, in response to a failure of the elastic spare unit, a storage location for storing reconstructed information of the failed elastic spare unit based on an iterative algorithm.

19. The controller of claim 16, further configured to reconstruct, in response to a failure of the elastic spare unit, information of the elastic spare unit using the retrieved information of the data object.

20. The controller of claim 16, wherein the layout function provides a storage location comprising one or more of: a device identifier and a location on a device.

* * * * *